(12) United States Patent
Shpigelman (10) Patent No.: US 10,131,003 B2
(45) Date of Patent: Nov. 20, 2018

(54) CEMENTED CARBIDE CORNER RADIUS END MILL WITH CONTINUOUSLY CURVED RAKE RIDGE AND HELICAL FLUTE DESIGN

(71) Applicant: Iscar, Ltd., Tefen (IL)

(72) Inventor: Leonid Shpigelman, Carmiel (IL)

(73) Assignee: Iscar, Ltd., Tefen (IL)

( * ) Notice: Subject to any disclaimer, the term of this patent is extended or adjusted under 35 U.S.C. 154(b) by 291 days.

(21) Appl. No.: 14/948,712

(22) Filed: Nov. 23, 2015

(65) Prior Publication Data

US 2017/0144234 A1 May 25, 2017

(51) Int. Cl.
  *B23C 5/10* (2006.01)

(52) U.S. Cl.
  CPC ........ *B23C 5/10* (2013.01); *B23C 2210/0414* (2013.01); *B23C 2210/0435* (2013.01); *B23C 2210/0457* (2013.01); *B23C 2210/082* (2013.01); *B23C 2210/206* (2013.01); *B23C 2210/405* (2013.01); *B23C 2222/28* (2013.01); *B23C 2222/64* (2013.01)

(58) Field of Classification Search
  CPC ... B23C 5/10; B23C 5/1009; B23C 2210/082; B23C 2210/084; B23C 2210/282; B23C 2210/321
  See application file for complete search history.

(56) References Cited

U.S. PATENT DOCUMENTS

| 6,846,135 | B2 | 1/2005 | Kuroda et al. | |
| 9,227,253 | B1 * | 1/2016 | Swift | B23C 5/28 |
| 9,517,515 | B2 * | 12/2016 | Shpigelman | B23C 5/10 |
| 2003/0180104 | A1 * | 9/2003 | Kuroda | B23C 5/10 407/54 |
| 2004/0170480 | A1 * | 9/2004 | Kawai | B23C 5/10 407/53 |
| 2006/0045637 | A1 * | 3/2006 | Flynn | B23C 5/10 407/53 |
| 2010/0008736 | A1 * | 1/2010 | Matsunaga | B23C 5/10 407/54 |
| 2011/0013998 | A1 * | 1/2011 | Tardivo | B23C 5/10 407/53 |
| 2011/0268513 | A1 * | 11/2011 | Takagi | B23C 5/10 407/54 |

(Continued)

FOREIGN PATENT DOCUMENTS

| DE | 9303053 U1 * | 4/1994 | ........... B23C 5/1009 |
| JP | 02-256412 A * | 10/1990 | ............... B23C 5/10 |

(Continued)

OTHER PUBLICATIONS

International Search Report dated Jan. 31, 2017, issued in PCT counterpart application (No. PCT/IL2016/051152).

(Continued)

*Primary Examiner* — Ryan Rufo
(74) *Attorney, Agent, or Firm* — Womble Bond Dickinson (US) LLP (57) ABSTRACT

A corner radius end mill includes a tooth adjacent a helically extending flute. The tooth includes axial and radial relief surfaces connected by a corner relief surface, as well as rake surface having a rake ridge. The rake ridge is continuously curved from a bisector line until at least an axial location rearward of the corner relief surface.

22 Claims, 5 Drawing Sheets

(56) References Cited

U.S. PATENT DOCUMENTS

| | | |
|---|---|---|
| 2014/0227049 A1 | 8/2014 | Budda et al. |
| 2014/0227050 A1 | 8/2014 | Budda et al. |
| 2014/0341662 A1 | 11/2014 | Yamayose |
| 2014/0356083 A1 | 12/2014 | Budda |
| 2015/0367427 A1* | 12/2015 | Burton ............... B23C 5/10 407/54 |

FOREIGN PATENT DOCUMENTS

| | | | | |
|---|---|---|---|---|
| JP | 2003-071625 A | * | 3/2003 | ............ B23C 5/10 |
| JP | 2003-159610 A | * | 6/2003 | ............ B23C 5/10 |
| JP | 2008-110472 A | * | 5/2008 | ............ B23C 5/10 |

OTHER PUBLICATIONS

Written Opinion dated Jan. 31, 2017, issued in PCT counterpart application (No. PCT/IL2016/051152).

* cited by examiner

CEMENTED CARBIDE CORNER RADIUS END MILL WITH CONTINUOUSLY CURVED RAKE RIDGE AND HELICAL FLUTE DESIGN

FIELD OF THE INVENTION

The subject matter of the present application relates to integral tooth corner radius end mills having a rake ridge at an intersection of rake recessed and rake cutting sub-surfaces, and a helical flutes design, especially for particularly difficult to machine materials such as inconel.

BACKGROUND OF THE INVENTION

End mills types can be considered to fall within three main end mill categories, namely ball, square and corner radius. The subject matter of the present application relates only to the latter category, corner radius end mills.

A corner of a corner radius end mill comprises a circular arc profile. The circular arc profile is present during rotation of such end mills about a rotation axis when the end mill is viewed in a direction perpendicular to the rotation axis. For the purposes of the specification and claims, this will be called a "profile view".

The circular arc profile defines a portion of an imaginary circle. The circle defines reference locations including: a circle center point, axial and radial tangent lines, axial and radial tangent points, and a bisector line. The axial tangent line extends forwardly from the circle center point and in a direction parallel with a rotation axis of the end mill. The radial tangent line extends radially outward from the circle center point and in a direction perpendicular with the rotation axis. The bisector line extends outward from the circle center point and intersects the circle at a bisector point equally circumferentially spaced from the axial and radial tangent points. Alternatively stated, a first angle subtended by the bisector line to the axial tangent line and a second angle subtended by the bisector line to the radial tangent line are equal. It will be understood that reference parameters such as the circle and associated lines, planes and tangent points, mentioned above are imaginary and hence are not visible features on an end mill but rather are derivable through the construction thereof as explained above.

Due to a competitive world-wide market, there is ever increasing demand for machining with end mills to provide better finish and longer tool life, even when machining workpieces made of difficult to machine materials such as inconel which quickly degrade an end mill. Such degradation is believed, in theory, to be at least in part due to heat transfer of a workpiece made to an end mill machining the workpiece.

It is believed that by providing a rake ridge at an intersection of rake recessed and rake cutting sub-surfaces, heat transfer to an end mill may be reduced. US 2014/0227050 assigned to the present Applicant discloses, for example in FIG. 1B, an example of such rake sub-surfaces with such rake ridge.

SUMMARY OF THE INVENTION

In accordance with a first aspect of the subject matter of the present application, there is provided a corner radius end mill having a tooth, the tooth comprising a rake ridge which is continuously curved from a bisector line until at least an axial location rearward of a corner relief surface of the tooth.

Known end mills of the type under consideration comprise a discontinuity along the rake ridge at an axial location coinciding with the corner relief surface. The present application provides a geometry in which the discontinuity is removed or rendered insignificant thereby allowing improved workpiece finish and tool longevity under the difficult conditions of machining materials such as inconel.

Notably, the subject matter of the present application does not relate to corner radius end mills made of materials in which the discontinuity shown in the prior art drawings is not typically present. More precisely, this application relates to end mills made of cemented carbide (in the broad sense of the name) and does not relate to end mills made of ceramic or end mills coated with expensive superhard materials (e.g. CBN, diamond).

In accordance with another aspect of the subject matter of the present application, there is provided a corner radius end mill having a rotation axis defining forward and rearward directions, and comprising:

front and rear ends and a peripheral surface extending therebetween;
a cutting portion extending rearwardly from the front end; and
a shank portion located rearward of the cutting portion;
the cutting portion having a cutting portion diameter at the front end and an effective cutting length, and comprising:
integrally formed teeth extending from the front end to the peripheral surface; and
a helical flute located between each pair of adjacent teeth and having a helix angle H fulfilling the condition: $25° \leq H \leq 60°$;
an index angle S subtended between each pair of adjacent teeth;
each tooth comprising:
a relief surface;
a rake surface;
a cutting edge formed at an intersection of the relief and rake surfaces; and
a corner comprising a circular arc profile defining a circle having a circle center point, a circle radius, axial and radial tangent lines, and a bisector line;
the relief surface comprising:
an axial relief surface at the front end;
a radial relief surface at the peripheral surface; and
a corner relief surface connecting the axial and radial relief surfaces;
the rake surface comprising:
a rake cutting sub-surface extending adjacent the cutting edge;
a rake recessed sub-surface; and
a rake ridge formed at an intersection of the rake cutting and rake recessed sub-surfaces;
the cutting edge comprising:
an axial sub-edge at the front end extending to the axial tangent line;
a corner sub-edge extending from the axial tangent line to the radial tangent line; and
a radial sub-edge extending rearward from the radial tangent line;
between the rake ridge and the cutting edge:
a radial cutting sub-surface width is measurable along the radial tangent line;
a bisector cutting sub-surface width is measurable along the bisector line; and
an axial cutting sub-surface width is measurable along the axial tangent line;

wherein the rake ridge of one or more of the teeth is continuously curved from the bisector line until at least an axial location rearward of the corner relief surface.

It will be understood that the above-said is a summary, and that any of the aspects above may further comprise any of the features described hereinbelow. Specifically, the following features, either alone or in combination and may be applicable to any of the above aspects:

A. An end mill can have a rotation axis defining forward and rearward directions.
B. An end mill can comprise front and rear ends and a peripheral surface extending therebetween.
C. An end mill can comprise a cutting portion extending rearwardly from a front end thereof.
D. An end mill can comprise a shank portion can be located rearward of a cutting portion thereof.
E. A cutting portion can have a cutting portion diameter at a front end thereof.
F. A cutting portion can have an effective cutting length.
G. A cutting portion can comprise integrally formed teeth extending from a front end to a peripheral surface of the end mill. Preferably, the plurality of teeth is an odd number of teeth. Most preferably the plurality of teeth is exactly seven or nine teeth. Without being bound to theory, an odd number of teeth and specifically teeth 7 or 9 teeth is believed more effective for machining difficult to machine materials such as inconel, due to vibration and heat reduction, while still provide sufficient flute space for tooth evacuation.
H. Each tooth of an end mill can comprise a relief surface, a rake surface, a cutting edge formed at an intersection of the rake surface and the relief surface, and a corner.
I. A relief surface can comprise: an axial relief surface at a front end; a radial relief surface at a peripheral surface; and a corner relief surface connecting the axial and radial relief surfaces.
J. A rake surface can comprise: a rake cutting sub-surface extending adjacent to a cutting edge; a rake recessed sub-surface; and a rake ridge formed at an intersection of the rake cutting and rake recessed sub-surfaces.
K. A cutting edge can comprise an axial sub-edge at the front end extending to the axial tangent line; a corner sub-edge extending from the axial tangent line to the radial tangent line; and a radial sub-edge extending rearward from the radial tangent line.
L. Each axial sub-edge can have an axial rake angle $\Phi$.
M. At least one, and preferably each, axial sub-edge can have a positive axial rake angle $\Phi$ (i.e. $\Phi$>0). More preferably, at least one, or even more preferably each, tooth has an axial rake angle $\Phi$ fulfilling the condition: $1°\leq\Phi\leq10°$. Without being bound to theory, such axial rake angle values are believed more effective for machining difficult to machine materials such as inconel.
N. Each corner sub-edge can have an corner rake angle E.
O. Each radial sub-edge can have a radial rake angle $\beta$.
P. One or more teeth can have a radial rake angle $\beta$ measurable along the radial tangent line fulfilling the condition: $\beta\geq-3°$. Preferably, one or more of the teeth can have a radial rake angle $\beta$ measurable along the radial tangent line fulfilling the condition: $\beta>0°$, preferably $\beta\geq2°$.
Q. One or more of the teeth can have a radial rake angle $\beta$ measurable along the radial tangent line fulfilling the condition: $\beta>0°$ and at least one other tooth can have a radial rake angle $\beta$ measurable along the radial tangent line fulfilling the condition: $\beta<0°$.
R. One or more teeth, or preferably each tooth, can have a rake angle $\beta$ measurable along the radial tangent line fulfilling the condition: $-12°\leq\beta\leq7°$, preferably $-5°\leq\beta\leq5°$, and most preferably $-3°\leq\beta\leq3°$.
S. At an intersection of radial and corner relief surfaces, radial and corner sub-edges can form an external relief angle $\theta_2$ fulfilling the condition: $170°\leq\theta\leq180°$, preferably $178°\leq\theta\leq180°$, and most preferably $179.5°\leq\theta\leq180°$.
T. A corner can comprise a circular arc profile defining portion of a circle having a circle center point, circle radius, axial and radial tangent lines, and a bisector line.
U. A flute, and preferably each flute, can be helically shaped.
V. A helical flute can be located between each pair of adjacent teeth and can having a helix angle H fulfilling the condition: $25°\leq H\leq60°$, preferably $32°\leq H\leq45°$. To clarify, each flute can have a variable helix angle, or different helix angles, as long as the value at each axial location does not extend outside said ranges.
W. Between the rake ridge and the cutting edge: a radial cutting sub-surface width is measurable along the radial tangent line; a bisector cutting sub-surface width is measurable along the bisector line; and an axial cutting sub-surface width is measurable along the axial tangent line. It is believed that by providing a substantially uniform cutting sub-surface width, a rake angle of a tooth can be more consistently controlled during production of the tooth which consequently can improve tool longevity.
X. A radial cutting sub-surface width $W_R$ and a bisector cutting sub-surface width $W_B$ can fulfill the condition: $0.9W_B\leq W_R\leq1.1W_B$, preferably $0.95W_B\leq W_R\leq1.05\%$.
Y. Each cutting sub-surface width W measurable from a rake ridge until a cutting edge and between radial and bisector lines can fulfill the condition: $0.9W_B\leq W\leq1.1W_B$, preferably $0.95W_B\leq W_R\leq1.05\%$.
Z. A radial cutting sub-surface width $W_R$ and an axial cutting sub-surface width $W_A$ can fulfill the condition: $0.9W_A\leq W_R\leq1.1W_A$ preferably $0.95W_A\leq W_R\leq1.05W_A$.
AA. Each cutting sub-surface width W measurable from a rake ridge until a cutting edge and between radial and tangent lines can fulfill the condition: $0.9W_A\leq W\leq1.1W_A$ preferably $0.95W_A\leq W\leq1.05W_A$.
BB. At least one, and preferably each, cutting sub-surface width W measurable from a rake ridge until a cutting edge and located between the axial tangent line and the bisector line can fulfill the condition: $0.008D_E\leq W\leq0.02D_E$. Preferably each cutting sub-surface width W measurable between axial and radial lines fulfills the condition: $0.008D_E\leq W\leq0.02D_E$.
CC. One or more, preferably each, rake cutting sub-surface can be planar shaped.
DD. A circle radius $R_C$ can fulfill the condition: $R_C\leq0.08D_E$. Notably, an end mill in accordance with the present subject matter is even achievable for a circle radius which is extremely small and difficult to produce without a significant discontinuity.
EE. An index angle S can be subtended between each pair of adjacent teeth. Some, or preferably a majority, of the index angles S at the front end of the end mill can have different values.
FF. Each index angle S, in the middle of an effective length, can have a value closer to a value equal to the total number of teeth divided by 360, than a value of the same index angle S at the front end of the mill.
GG. An end mill can comprise a tapered core which increases along the rearward direction from the front end.

HH. A rake ridge can be continuously curved from a bisector line until an axial location rearward of a radial tangent line ($L_R$).

II. Each tooth of an end mill can have a rake ridge which continuously curves from the bisector line until at least an axial location rearward of the corner relief surface. The continuous curvature can extend to rearward of a radial tangent line. Each tooth of the plurality of teeth can comprise any of the features recited above.

JJ. An end mill, or at least a cutting portion thereof, can be made of cemented carbide.

KK. A rake cutting sub-surface of a corner can comprise three distinct sub-portions (resulting from a different manufacturing step for each sub-portion which is apparent upon examination). Namely, a radial sub-portion adjacent a peripheral surface of the end mill, an axial sub-portion adjacent a front end of the end mill, and a corner sub-portion connecting the radial sub-portion and axial sub-portion. While producing a cutting sub-surface in sub-portions (i.e. multiple production steps) is more expensive than a single step production, it is believed that the benefit provided from such construction has been found to outweigh known disadvantages. For example, exactly three cutting sub-surface-sub-portions allows beneficial controlled production of continuous rake values.

It is believed that each feature above, alone and all the more so in combination, can contribute to better workpiece finish and/or tool longevity, particularly when machining difficult to machine materials such as inconel.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1A:
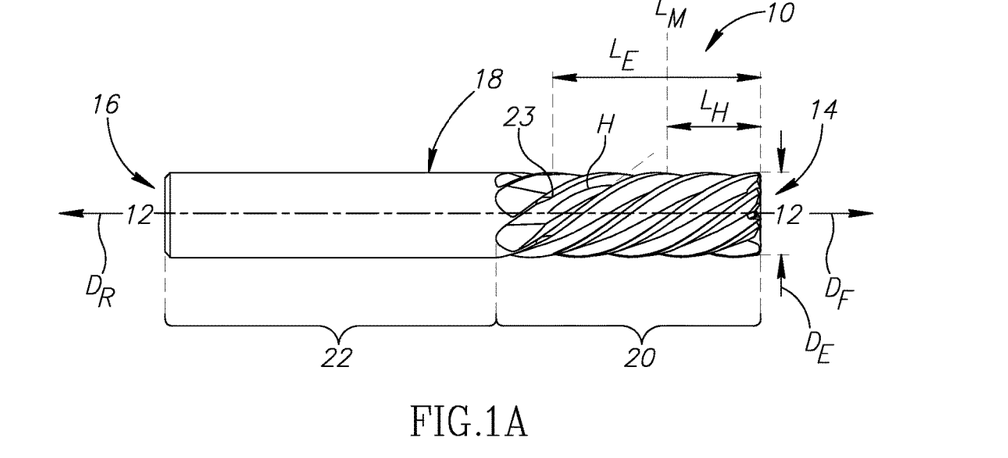
FIG. 1A is a side view of an end mill in accordance with the subject matter of the present application.
Figure 1B:
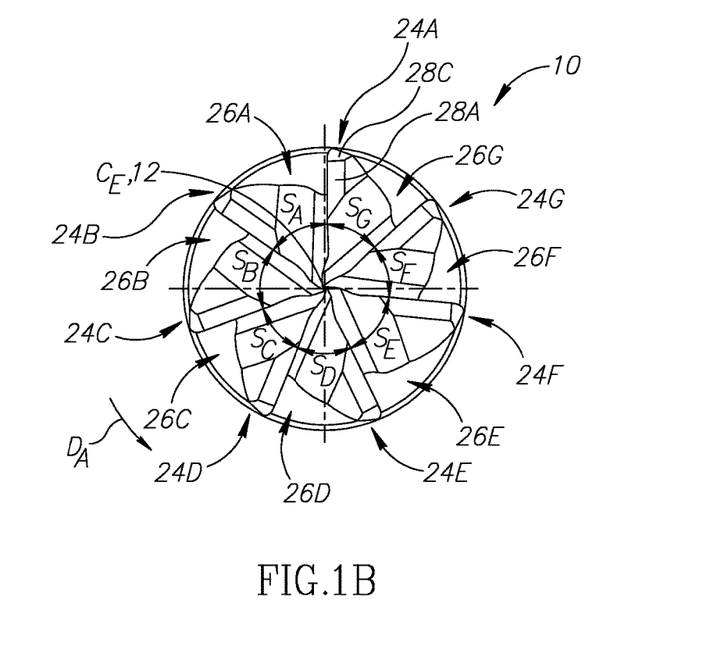
FIG. 1B is a front end view of the end mill in FIG. 1A.

Reference is made to FIGS. 1A and 1B, which illustrate a corner radius end mill 10, made of cemented carbide, and particularly configured for machining difficult to machine materials such as inconel.

The end mill 10 is configured to rotate about a rotation axis 12, which can extend longitudinally through the center thereof and coincide with an end mill center point $C_E$. In this example an end mill rotation direction $D_A$ is counter-clockwise in the front end view shown in FIG. 1B. The rotation axis 12 can define a forward direction $D_F$ and an opposite rearward direction $D_R$ (noting that while these directions are parallel with the rotation axis 12 they need not be coaxial therewith).

The end mill 10 can comprise opposite front and rear ends 14, 16 and a peripheral surface 18 extending between the front and rear ends 14, 16.

The end mill 10 can comprise a cutting portion 20 and a shank portion 22 located rearward of the cutting portion 20.

The cutting portion 20 can comprise a cutting portion diameter $D_E$, measurable at the front end 14 and an effective cutting length $L_E$. The effective cutting length $L_E$ extends from the front end 16 to an axial location where tooth relief surfaces are no longer effective, which is visible in this example at the axial location designated with the reference character "23". Also exemplified is the front half of the effective cutting length, designated $L_H$, which extends from the front end 14 to an axial location $L_M$ at the middle of the effective length $L_E$.

The cutting portion 20 comprises integrally formed teeth 24 (e.g., first, second, third, fourth, fifth, sixth and seventh teeth 24A, 24B, 24C, 24D, 24E, 24F, 24G).

An index angle S (e.g., first, second, third, fourth, fifth, sixth and seventh index angles $S_A$, $S_B$, $S_C$, $S_D$, $S_E$, $S_F$, $S_G$) is subtended between each pair of adjacent teeth. In the example shown all of the index angles have different values at the front end 14. Nonetheless the index angles converge towards equality (which for an end mill with seven teeth is 360°/7=51.4°) with increasing proximity to the axial location at the middle of the effective length $L_M$ and in this example then diverge therefrom.

The cutting portion 20 comprises a helical flute 26 (e.g., first, second, third, fourth, fifth, sixth and seventh flutes 26A, 26B, 26C, 26D, 26E, 26F, 26G), i.e. at least extending helically adjacent to the front end 14, circumferentially located between each pair of adjacent teeth 24.

Each flute 26 can have a helix angle H formed with the rotation axis 12.

Figure 3A:
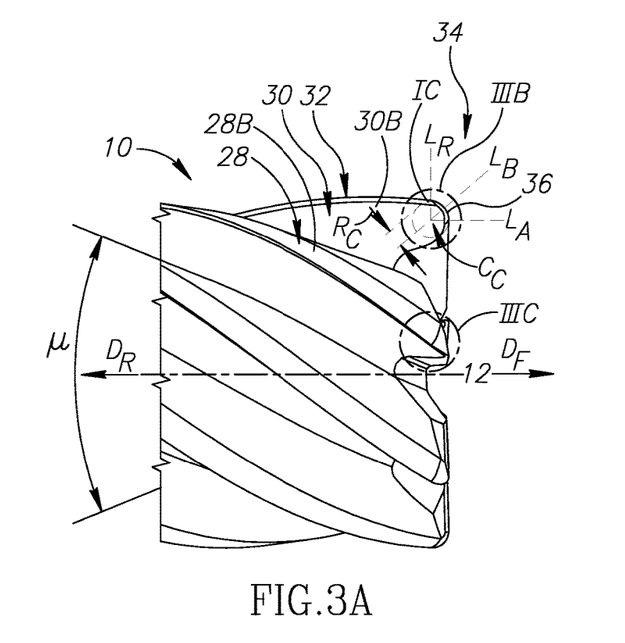
FIG. 3A is a side view of a part of a cutting portion of the end mill in FIGS. 1A and 1B shown in a corresponding view to FIG. 2A.

Referring now also to FIG. 3A, it is noted that, at least adjacent the front end 14, the end mill 10 can comprise a tapered core schematically shown by a tapering angle μ.

Each tooth 24 can comprise the following generally designated portions: a relief surface 28, a rake surface 30, a cutting edge 32 formed at an intersection of the relief surface 28 and the rake surface 30, and a corner 34. It is noted that the relief surface 28 identified in FIG. 3A is the relief surface of a tooth 24 different to the tooth shown with the numerical designations of the other elements, this being only because the relief surface of the uppermost tooth in FIG. 3A is not visible in the profile view shown.

In the profile view shown in FIG. 3A, during rotation of the end mill 10 about the rotation axis 12, the corner 34 presents a circular arc profile defining a portion 36 of an imaginary circle $I_C$.

Figure 3B:
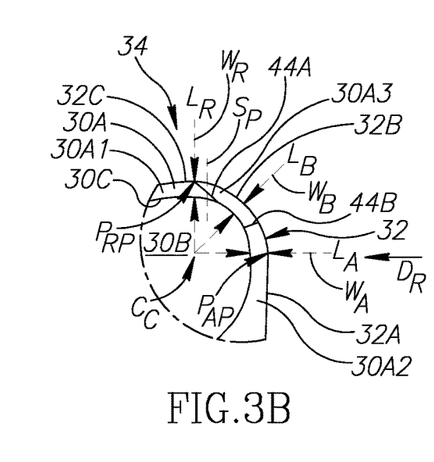
FIG. 3B is an enlarged profile view of a corner designated IIIB in FIG. 3A.
Figure 3C:
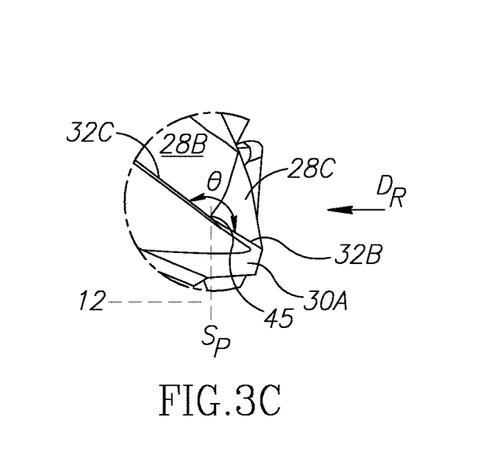
FIG. 3C is an enlarged view of a portion designated IIIC in FIG. 3A.

Referring also to FIG. 3C, it is noted the circle $I_C$ has: a circle center point $C_C$; axial and radial tangent lines $L_A$, $L_R$; axial and radial tangent points $P_{AP}$, $P_{RP}$ located at intersections of the axial and radial tangent lines $L_A$, $L_R$ and the cutting edge 32; a bisector line $L_B$ equally angularly spaced between the axial and radial tangent lines $L_A$, $L_R$.

The relief surface 28 comprises different portions, namely an axial relief surface 28A (FIG. 1B) at the front end 14, a radial relief surface 28B (FIG. 3A) at the peripheral surface 18, and a corner relief surface 28C (FIG. 3C) connecting the axial and radial relief surfaces 28A, 28B.

As shown in FIG. 3B, the rake surface 30 comprises different portions, namely a rake cutting sub-surface 30A extending adjacent the cutting edge 32, a rake recessed sub-surface 30B, and a rake ridge 30C formed at an intersection of the rake cutting and rake recessed sub-surfaces 30A, 30B.

The cutting edge 32 comprises different portions, namely an axial sub-edge 32A at the front end 14 extending to the axial tangent line $L_A$, a corner sub-edge 32B extending from the axial tangent line $L_A$ to the radial tangent line $L_R$, and a radial sub-edge 32C extending rearward from the radial tangent line $L_R$.

Figure 4A:
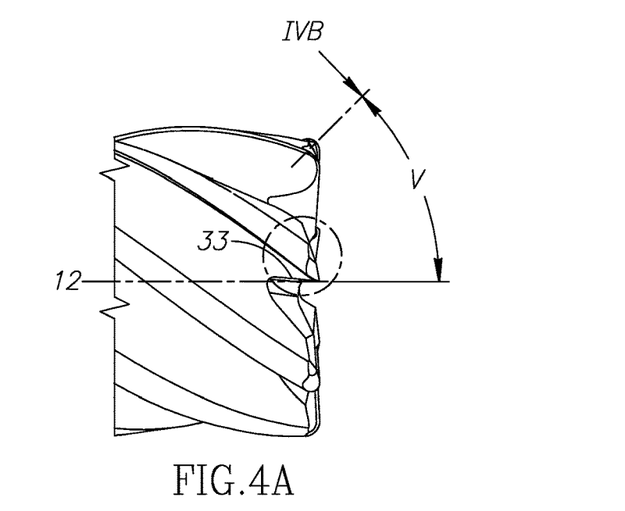
FIG. 4A is a slightly rotated view of the end mill in FIG. 3A.
Figure 4B:
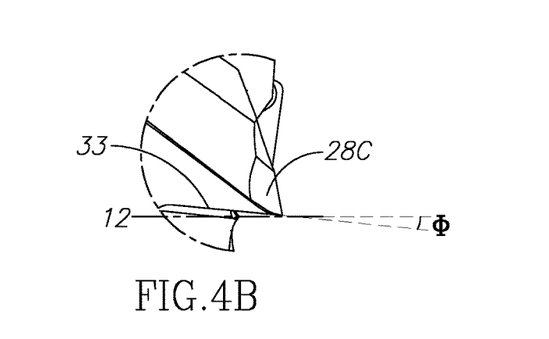
FIG. 4B is an enlarged view of a corner designated IVB in FIG. 4A.

As shown in FIGS. 4A and 4B, an axial rake angle $\Phi$ is subtended between a gash surface line 33 to the rotation axis 12. The example axial rake angle $\Phi$ shown is a positive angle.

Figure 4C:
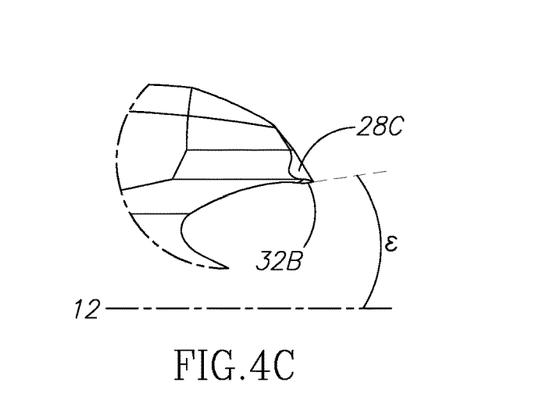
FIG. 4C is yet another enlarged view of a corner of the end mill in FIG. 4A taken in the view shown by arrow IVA, which is at a 45° angle (shown as angle "V") to the rotation axis.

Similarly, shown in FIG. 4C, a corner rake angle $\varepsilon$ is subtended between the corner sub-edge 32B and the rotation axis 12.

Figure 5A:
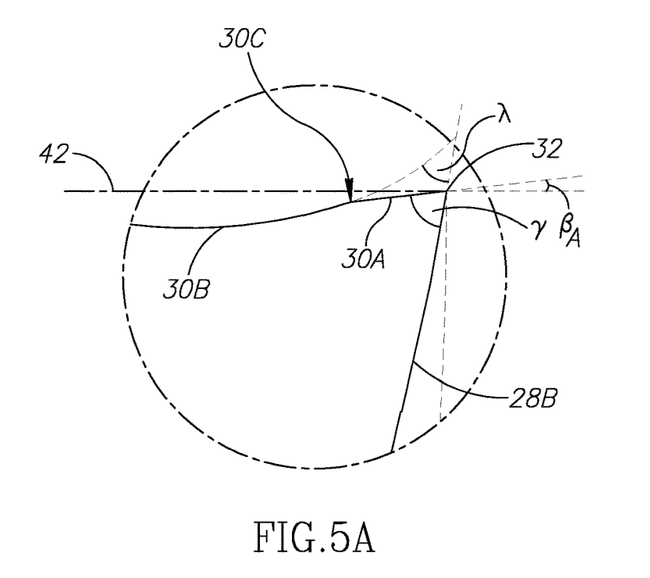
FIGS. 5A and 5B are enlarged views exemplifying recessed rake sub-surfaces.
Figure 5B:
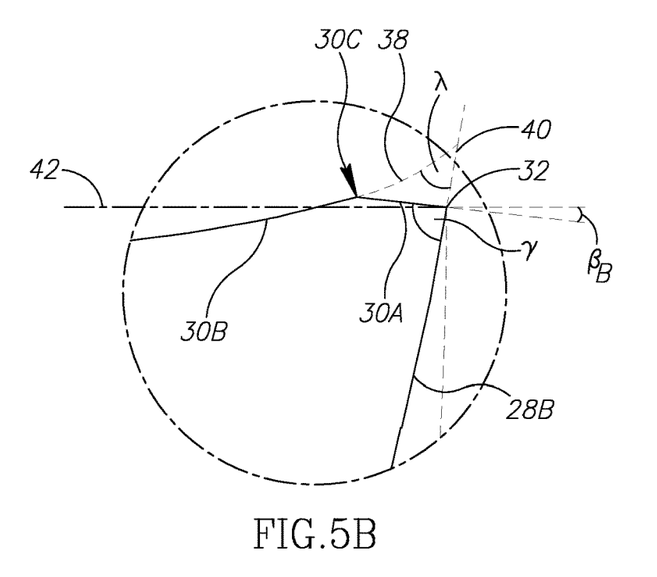

Referring to FIGS. 5A and 5B, example rake cutting sub-surfaces 30A, rake recessed sub-surfaces 30B, and rake ridges 30C are shown. Notably each rake ridge 30C has a ridge shape, i.e., in the view shown, an apex descending to the rake cutting and rake recessed sub-surfaces 30A, 30B. This shape occurs regardless of whether the rake ridge 30C is located below a radial line 42 extending from the rotation axis 12 to the radial sub-edge 32C such as that shown in FIG. 5A (and hence exemplifying a positive radial rake angle, i.e. $\beta_A > 0°$), or above the radial line 42 as exemplified in FIG. 5B (showing a negative radial rake angle, i.e. $\beta_B < 0°$).

Each rake cutting sub-surface 30A has an actual internal cutting angle $\gamma$ having a greater value than an imaginary internal cutting angle $\lambda$ associated with the rake recessed sub-surface 30B. More precisely, referring to FIG. 5B as an example, an imaginary rake extension line 38, extending the rake recessed sub-surface 30B from the rake ridge 30C intersects an imaginary relief extension line 40 which extends the radial relief surface 28B.

The rake cutting sub-surfaces 30A can have a planar shape (as is understood from the straight line visible in the side views in FIGS. 5A and 5B).

The rake recessed sub-surfaces 30B of each tooth can have the same shape, which can be a concave shape as shown in FIGS. 5A and 5B. Notably, the shape is recessed from the associated rake cutting sub-surface 30A so that chips which have been machined from a workpiece (not shown) can preferably pass over the rake recessed sub-surface 30B without contact, especially at points immediately adjacent the rake ridge 30C, thereby reducing heat transfer to the end mill.

Reverting to FIG. 3B, cutting sub-surface widths W (e.g., $W_R$, $W_B$, $W_A$) are measurable between closest points of the rake ridge 30C and the cutting edge 32. A radial cutting sub-surface width $W_R$ is measurable along the radial tangent line $L_R$, a bisector cutting sub-surface width $W_B$ is measurable along the bisector line $L_{B2}$, and an axial cutting sub-surface width $W_A$ is measurable along the axial tangent line $L_A$.

The rake cutting sub-surface 30A can comprise three distinct sub-portions. Namely, a radial sub-portion 30A1, an axial sub-portion 30A2, and a corner sub-portion 30A3. First and second curvature lines 44A, 44B may be visible to show limits of the sub-portions.

Referring to FIG. 3C, a perpendicular plane $S_P$, extending perpendicular to the rotation axis 12, can be defined at the rearmost point 45 of the corner relief surface 28C. The perpendicular plane $S_P$ defines an axial location along the rotation axis 12. The end mill 10 can then be rotated around the rotation axis 12 until the profile view shown in FIG. 3B is visible. As shown the perpendicular plane $S_P$ is also derivable in FIG. 3B even though the corner relief surface 28C is not visible, since the axial location has been noted. It will be understood that the precise axial location of the perpendicular plane $S_P$ in FIG. 3B has been added schematically for explanatory purposes only.

In any case, in FIG. 3B it can be seen that the rake ridge 30C is continuously curved from the bisector line $L_B$ until at least an axial location, shown by perpendicular plane $S_P$, rearward of the corner relief surface 28C. Indeed the rake ridge 30C is continuously curved in the entire view shown in FIG. 3B. In this context, "continuously curved" means that the rake ridge 30C does not contain a discontinuity.

Figure 2A:
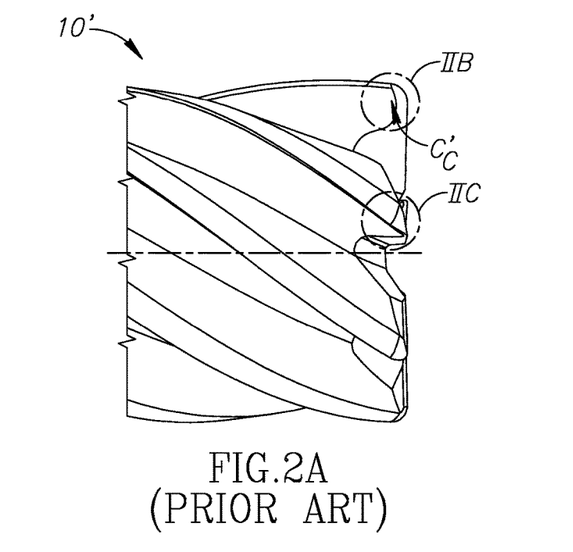
FIG. 2A is a side view of a part of a cutting portion of a prior art end mill.
Figure 2B:
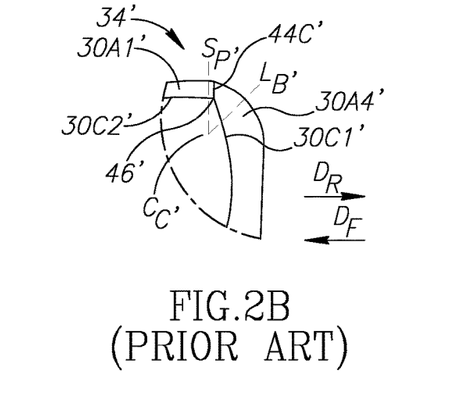
FIG. 2B is an enlarged profile view of a corner designated IIB in FIG. 2A.
Figure 2C:
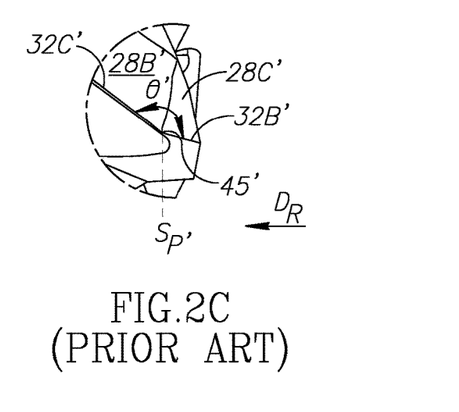
FIG. 2C is an enlarged view of a portion designated IIC in FIG. 2A.

By contrast, a prior art end mill 10' is shown in FIGS. 2A to 2C with basically corresponding elements having the same reference characters suffixed with an apostrophe ('). It is noted that instead of three distinct sub-portions 30, the corner 34' has two sub-portions, namely a radial sub-portion 30A1' and a single corner-axial sub-portion 30A4' which is shown to meet the radial sub-portion 30A1' at a single curvature line 44C'. An corner-axial rake ridge portion 30C 1' extending along the single corner-axial sub-portion 30A4' does not continuously curve to the connected radial rake ridge portion 30C2' as shown by the discontinuity 46'. Notably a perpendicular plane $S_{P'}$, which locates the axial location of the rearmost point 45' of the corner relief surface 28C' (FIG. 2C), is located rearward of the discontinuity 46'.

It will also be understood that an external relief angle $\theta$ (FIG. 3C), measured between the corner and radial sub-edges 32B, 32C can be advantageously closer to 180° than the comparatively smaller external relief angle $\theta'$ (FIG. 2C) of the prior art tool 10'.

The description above includes an exemplary embodiment and details, and does not exclude non-exemplified embodiments and details from the claim scope of the present application.

What is claimed is:

1. A cemented carbide corner radius end mill (10) having a rotation axis (12) defining forward and rearward directions ($D_F$, $D_R$), and comprising:
   front and rear ends (14, 16) and a peripheral surface (18) extending therebetween;
   a cutting portion (20) extending rearwardly from the front end (14); and
   a shank portion (22) located rearward of the cutting portion (20);
   the cutting portion (20) having a cutting portion diameter $D_E$ at the front end (14) and an effective cutting length ($L_E$) and comprising:
   integrally formed teeth (24) extending from the front end (14) in the rearward direction, along the peripheral surface (18); and
   a helical flute (26) located between each pair of adjacent teeth (24) and having a helix angle H fulfilling the condition: $25° \leq H \leq 60°$;
   an index angle S subtended between each pair of adjacent teeth (24);
   each tooth (24) comprising:
   a relief surface (28);
   a rake surface (30);

a cutting edge (32) formed at an intersection of the relief and rake surfaces (28, 30); and
a corner (34) comprising a circular arc profile defining a portion (36) of a circle ($I_C$) having a circle center point ($C_C$), a circle radius $R_C$, axial and radial tangent lines ($L_A$, $L_R$), and a bisector line ($L_B$);
the relief surface (28) comprising:
an axial relief surface (28A) at the front end (16);
a radial relief surface (28B) at the peripheral surface (18); and
a corner relief surface (28C) connecting the axial and radial relief surfaces (28A, 28B);
the rake surface (30) comprising:
a rake cutting sub-surface (30A) extending adjacent the cutting edge (32);
a rake recessed sub-surface (30B); and
a rake ridge (30C) formed at an intersection of the rake cutting and rake recessed sub-surfaces (30A, 30B) wherein
the rake cutting sub-surface (30A) is closer to the cutting edge (32) than the rake recessed sub-surface (30B);
the cutting edge (32) comprising:
an axial sub-edge (32A) at the front end (14) extending to the axial tangent line ($L_A$);
a corner sub-edge (32B) extending from the axial tangent line ($L_A$) to the radial tangent line ($L_R$); and
a radial sub-edge (32C) extending rearward from the radial tangent line ($L_R$);
between the rake ridge (30C) and the cutting edge (32):
a radial cutting sub-surface width $W_R$ is measurable along the radial tangent line ($L_R$);
a bisector cutting sub-surface width $W_B$ is measurable along the bisector line ($L_B$); and
an axial cutting sub-surface width $W_A$ is measurable along the axial tangent line ($L_A$);
wherein the rake ridge (30C) of one or more of the teeth (34) is continuously curved from the bisector line ($L_B$) until at least an axial location rearward of the corner relief surface (28C);
wherein the radial cutting sub-surface width $W_R$ and bisector cutting sub-surface width $W_B$ fulfill the condition: $0.9W_B \leq W_R \leq 1.1W_B$.

2. The end mill (10) according to claim 1, wherein, at an intersection of the radial and corner relief surfaces (28B, 28C), the radial and corner sub-edges (32B, 32C) form an external relief angle $\theta$ fulfilling the condition: $170° \leq \theta \leq 180°$.

3. The end mill (10) according to claim 2, wherein the external relief angle $\theta$ fulfills the condition: $178° \leq \theta \leq 180°$.

4. The end mill (10) according to claim 1, wherein each cutting sub-surface width W measurable between the rake ridge and the cutting edge, and taken between the radial tangent line and the bisector line, fulfills the condition: $0.9W_B \leq W \leq 1.1W_B$.

5. The end mill (10) according to claim 1, wherein the radial cutting sub-surface width $W_R$ and the axial cutting sub-surface width $W_A$ fulfill the condition: $0.9W_A \leq W_R \leq 1.1W_A$.

6. The end mill (10) according to claim 1, wherein each cutting sub-surface width W measurable between the rake ridge and the cutting edge, and taken between the radial tangent line and the axial tangent line, fulfills the condition: $0.9W_A \leq W \leq 1.1W_A$.

7. The end mill (10) according to claim 1, wherein at least one cutting sub-surface width W measurable between the rake ridge and the cutting edge, and taken between the axial tangent line and the bisector line, fulfills the condition: $0.008D_E \leq W \leq 0.02D_E$.

8. The end mill (10) according to claim 7, wherein each cutting sub-surface width W taken between the axial tangent line and the bisector line, fulfills the condition: $0.008D_E \leq W \leq 0.02D_E$.

9. The end mill according to claim 8, wherein each cutting sub-surface width W measurable between the axial tangent line and the radial tangent line, fulfills the condition: $0.008D_E \leq W \leq 0.02D_E$.

10. The end mill (10) according to claim 1, wherein each rake cutting sub-surface (30A) is planar shaped.

11. The end mill (10) according to claim 1, wherein the circle radius $R_C$ fulfills the condition: $R_C \leq 0.08D_E$.

12. The end mill (10) according to claim 1, wherein the cutting portion (20) comprises exactly either seven teeth (24) or nine teeth (24).

13. The end mill (10) according to claim 1, wherein one or more of the teeth (24) has a radial rake angle $\beta$ measurable along the radial tangent line ($L_R$) fulfilling the condition: $-12° \leq \beta \leq 7°$.

14. The end mill (10) according to claim 13, wherein each tooth (24) has a radial rake angle $\beta$ measurable along the radial tangent line ($L_R$) fulfilling the condition: $-5° \leq \beta \leq 5°$.

15. The end mill (10) according to claim 1, wherein one or more of the teeth (24) has a radial rake angle $\beta$ measurable along the radial tangent line ($L_R$) fulfilling the condition: $\beta > 0°$.

16. The end mill (10) according to claim 1, wherein one or more of the teeth (24) has a radial rake angle $\beta$ measurable along the radial tangent line ($L_R$) fulfilling the condition: $\beta < 0°$.

17. The end mill (10) according to claim 1, wherein, at the front end (14), fewer than one-half the index angles have the same value.

18. The end mill (10) according to claim 17, wherein each index angle S, in the middle of an effective length ($L_M$), has a value closer to a value equal to the total number of teeth (24) divided by 360, than a value of the same index angle S at the front end (14).

19. The end mill (10) according to claim 1, wherein each tooth (24) has a rake ridge (30C) which continuously curves from the bisector line ($L_B$) until at least an axial location rearward of the corner relief surface (28C).

20. The end mill (10) according to claim 10, wherein each tooth (24) has a rake ridge (30C) which continuously curves from the bisector line ($L_B$) until at least an axial location rearward of the corner relief surface (28C).

21. The end mill (10) according to claim 20, wherein for each tooth, at an intersection of the radial and corner relief surfaces (28B, 28C), the radial and corner sub-edges (32B, 32C) form an external relief angle $\theta$ fulfilling the condition: $170° \leq \theta \leq 180°$.

22. The end mill (10) according to claim 21, wherein the external relief angle $\theta$ fulfills the condition: $178° \leq \theta \leq 180°$.

* * * * *